United States Patent [19]

Nelson

[11] Patent Number: 5,642,814
[45] Date of Patent: Jul. 1, 1997

[54] LITTER SEPARATOR FOR HOUSEHOLD PETS

[76] Inventor: Lawrence Farrell Nelson, 105 E. Valerio St., Santa Barbara, Calif. 93101

[21] Appl. No.: 654,022

[22] Filed: May 28, 1996

Related U.S. Application Data

[63] Continuation of Ser. No. 332,099, Oct. 31, 1994, abandoned.

[51] Int. Cl.$^6$ ............................ B07B 1/00; A01K 29/00
[52] U.S. Cl. ........................ 209/235; 209/352; 119/166
[58] Field of Search ..................... 209/235, 247, 209/248, 252, 259, 260, 352, 374, 417, 420; 119/166, 168

[56] References Cited

U.S. PATENT DOCUMENTS

| | | | |
|---|---|---|---|
| 448,818 | 3/1891 | Humphreys | 209/248 |
| 471,177 | 3/1892 | Humphreys | 209/249 |
| 4,190,525 | 2/1980 | Menzel | 209/235 |
| 4,327,667 | 5/1982 | Bilak | 209/352 X |
| 5,076,627 | 12/1991 | Simon | 209/417 X |
| 5,226,388 | 7/1993 | McDaniel | 119/166 |
| 5,267,530 | 12/1993 | Zamoyski | 119/166 |
| 5,341,763 | 8/1994 | Bondurant, III | 119/166 |

*Primary Examiner*—D. Glenn Dayoan
*Assistant Examiner*—Tuan Nguyen

[57] ABSTRACT

A litter separator including a container, an inclined baffle and a sieve, the separator being useful for removing unwanted animal waste from a reusable litter. A reusable litter containing particulate animal waste material is poured into the open top of the container. The particulate mixture being made of unwanted waste and litter is propelled under force of gravity, and the guidance provided by the inclined baffle toward the sieve which is pivotally affixed to the baffle. The sieve serves as a porous barrier covering a hole in the baffle and is held in position by gravity and the weight of the litter mass to be processed. The clumps of unwanted waste which are too large to pass through the porous sieve remain above the sieve and barrier in the upper portion of the container. The smaller litter passes through the sieve, free of contaminated clumped waste, and proceeds under the force of gravity through the opening in the baffle into the lower portion of the container below the sieve and baffle. Unwanted animal waste material in the upper portion of the container is removed for disposal by tilting the container away from the sieve and dumping the waste out. The reusable litter in the lower portion of the container is trapped behind the baffle and remains therein. The separator is then tilted in the direction of the sieve. The cleaned litter in the lower portion falls, under force of gravity, through the opening in the baffle toward and against the sieve which, being pivotally mounted, opens, emptying the waste-free litter into the litter box for reuse.

1 Claim, 4 Drawing Sheets

LITTER SEPARATOR FOR HOUSEHOLD PETS

CROSS REFERENCE TO RELATED APPLICATIONS

This is a continuation of application Ser. No. 08/332,099 filed Oct. 31, 1994, abandoned.

BACKGROUND OF THE INVENTION

1. Field of Invention

This invention relates to pet care, specifically an improved method for the separation of animal waste from litter.

2. Description of Prior Art

This invention relates to a cat box accessory which functions to separate waste from a mass of cat litter. There are a number of commercially available apparatus of which the inventor is aware that are intended to permit the separation of waste from a mass of litter. Known designs seem to divide themselves into simple hand held scoops and complex mechanical devices.

The former is characterized by the scoop marketed by Four Paws Products Ltd. U.S. Pat. No. 5,076,627 inventor: Simon Allen (US). This device is a shovel like slotted scoop which is passed through the litter to remove the clumped waste. The problems with the scoop are that it is difficult to locate the buried waste, the intimate contact of the scoop operator with same, the almost inevitable spillage of same in the process of transfer to another container for disposal, and the potential for breathing the dust which is generated by the by the digging and sifting process which is intrinsic to this method.

The designs involving somewhat complex mechanical design and construction run the gamut of mechanical principals.

For example: U.S. Pat. No. 5,267,530 Inventors: Zamoyski Mark (US) calls for a mechanism utilizing sprockets and chains which allow a blade basket mechanism to be drawn through the litter.

Another design: U.S. Pat. No. 5,226,388 Inventors: Mc Daniel Brian (US) incorporates an electric motor to drive a scoop mounted on rails which removes waste from the litter.

Yet other apparatus: U.S. Pat. No. 4,327,667 Inventors: Bilak Richard C (US) incorporates a spring loaded, lever operated, trap door to dump the litter through an angled screening device to separate the clumped waste from the litter.

The complex nature of the heretofore mentioned litter separators renders them expensive to manufacture and accordingly unattractively priced to potential buyers.

The present invention overcomes the above drawbacks by providing a litter separation assembly which is very simple in structure. In its simplicity, the present invention achieves efficient separation of waste from a mass of litter without the need of handling the waste except to pour it into the trash or other means of disposal. No prior art has been found directly germane to this invention.

OBJECTS AND ADVANTAGES

Accordingly, several objects and advantages of the present invention are simplicity of design and manufacture, and therefore reduced cost and complete cleaning of the litter with every use, thus extending the life of the litter. The simplicity of the device militates toward its frequent use, thus enhancing the hygiene of the cat as well as that of the owner, in that it minimizes contact with animal waste and the diseases borne by the same.

Still further objects and advantages will become apparent from a consideration of the ensuing description and accompanying drawings.

REFERENCE NUMERALS

| 2  | container          | 12A | pivot  | 18A | handhold  |
|----|--------------------|-----|--------|-----|-----------|
| 4  | baffle             | 12B | pivot  | 18B | handhold  |
| 6  | opening            | 14  | bail   | 20  | receptacle|
| 8  | collection chamber | 16A | handle |     |           |
| 10 | sieve              | 16B | handle |     |           |

SUMMARY

An efficient device for cleaning of animal waste from litter. The device is composed of a container of sufficient size to contain the litter to be cleaned, a receptacle, a baffle, a sieve, either fixed or pivoted, and a collection chamber. The litter to be cleaned is poured into the receptacle. The waste which is too large to pass through the sieve remains in the receptacle while the litter which is now free of waste flows into the lower chamber. The container is tilted toward the baffle which serves to contain the litter in the collection chamber and to convey the waste into the trash. The container is then tilted toward the sieve and the cleaned litter flows back into the cat litter box.

PREFERRED EMBODIMENT

1. Description

Figure 1:
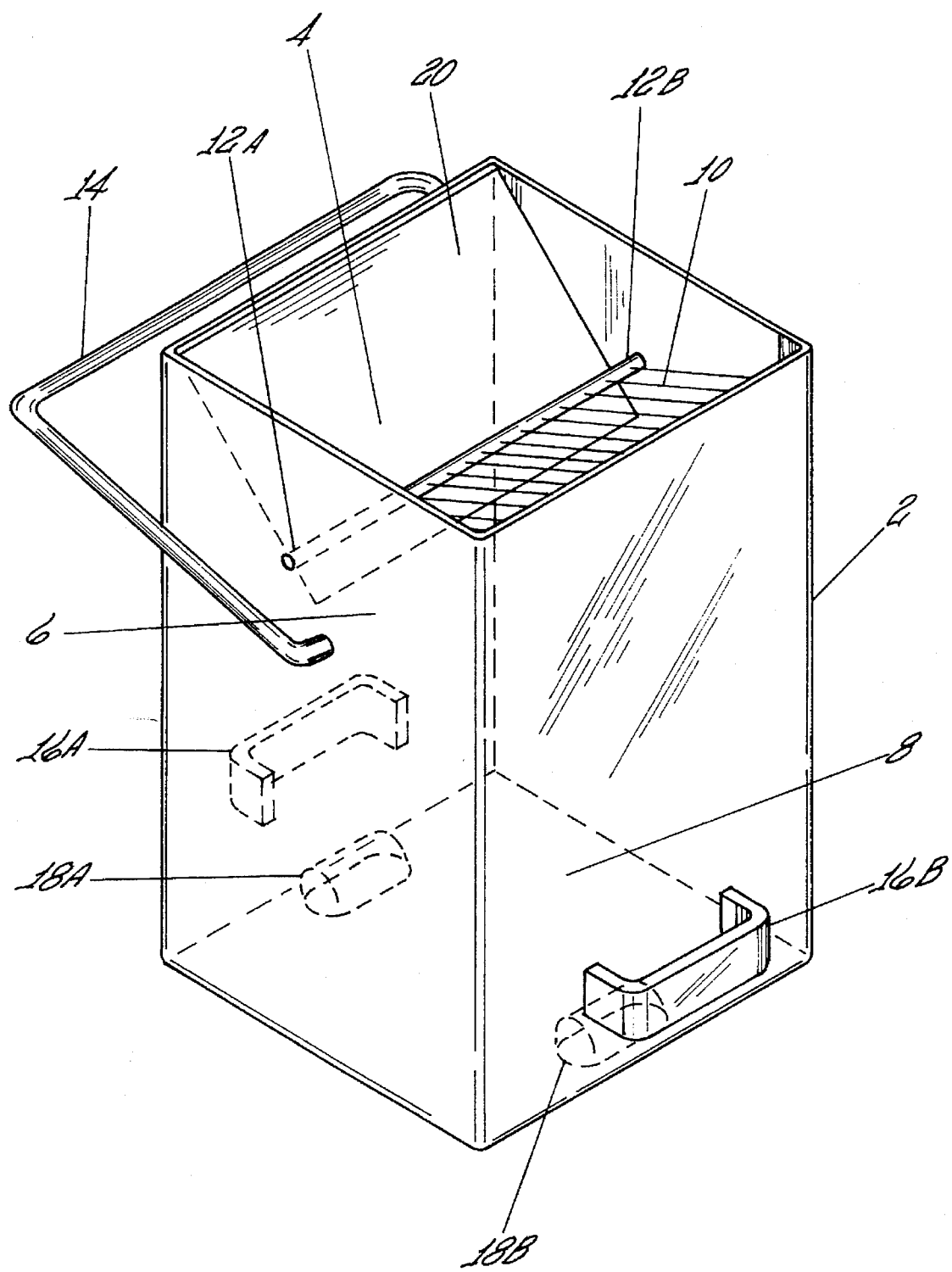
FIG. 1 is a perspective view of my invention

FIG. 1 shows an overall view of the litter separator of the invention. The litter separator is composed of a container 2 of sufficient size to contain the litter to be cleaned. A baffle 4 is attached to the edge of lip of container 2 and angled downward toward the bottom of container 2. Baffle 4 encloses one end of container 2 with the exception of an opening 6 to the collection chamber 8. A sieve 10 traverses opening 6 and is mounted to container 2 via means of pivots 12A and 12B. Sieve 10 is arranged such that its outer edge rests against the side of container 2 at an opposing angle to baffle 4. A bail 14 is attached to the sides of container 2 in the same axial orientation as pivots 12A and 12B. Handle 16A and 16B or handhold 18A and 18B are attached or molded on the opposing axis to pivots 12A and 12B. A receptacle 20 is defined by baffle 4, sieve 10, and the sides of container 2 through which the litter is introduced.

2. Operation

Figure 2:
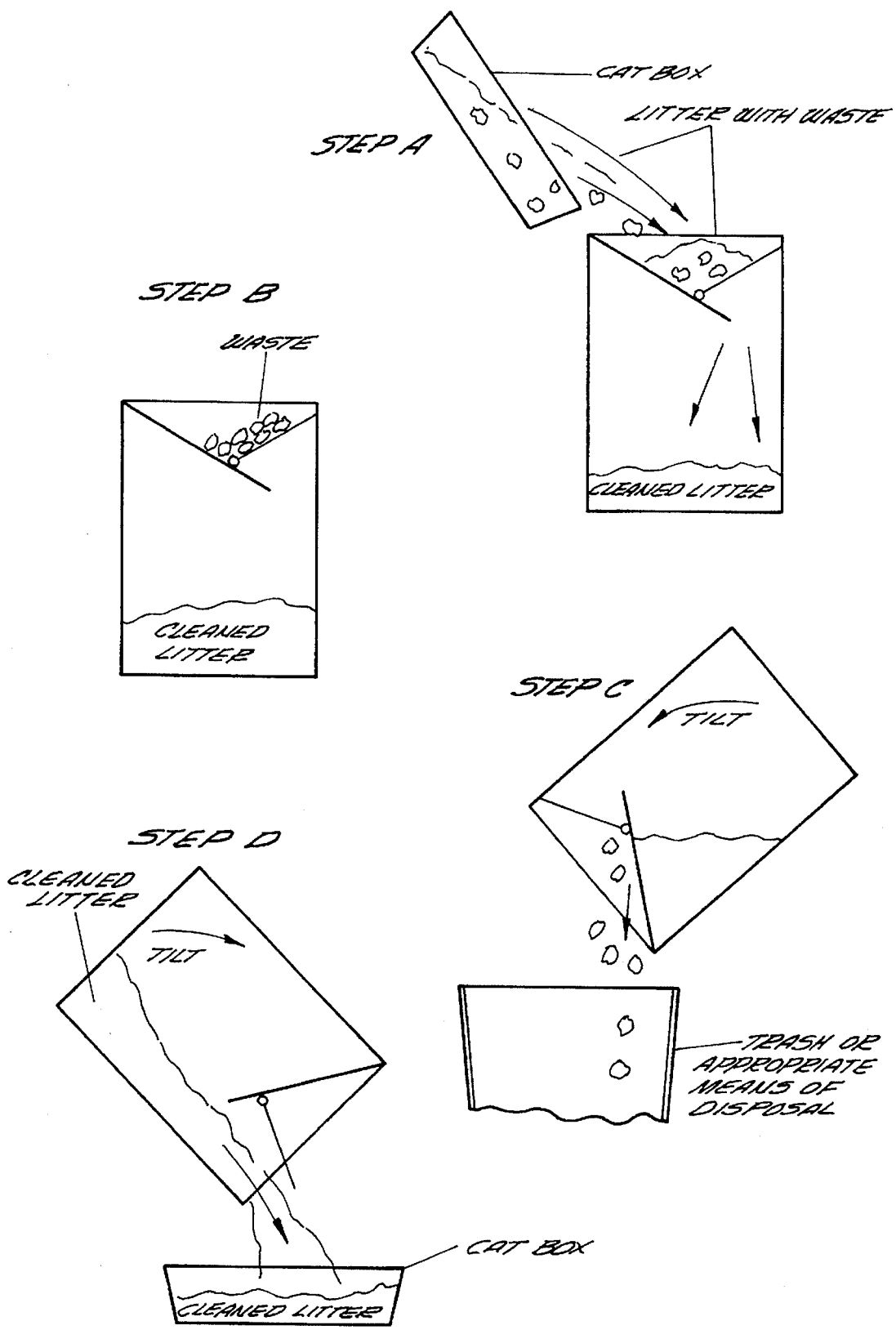
FIG. 2 is a flow chart of the operation of the invention
Figure 3:
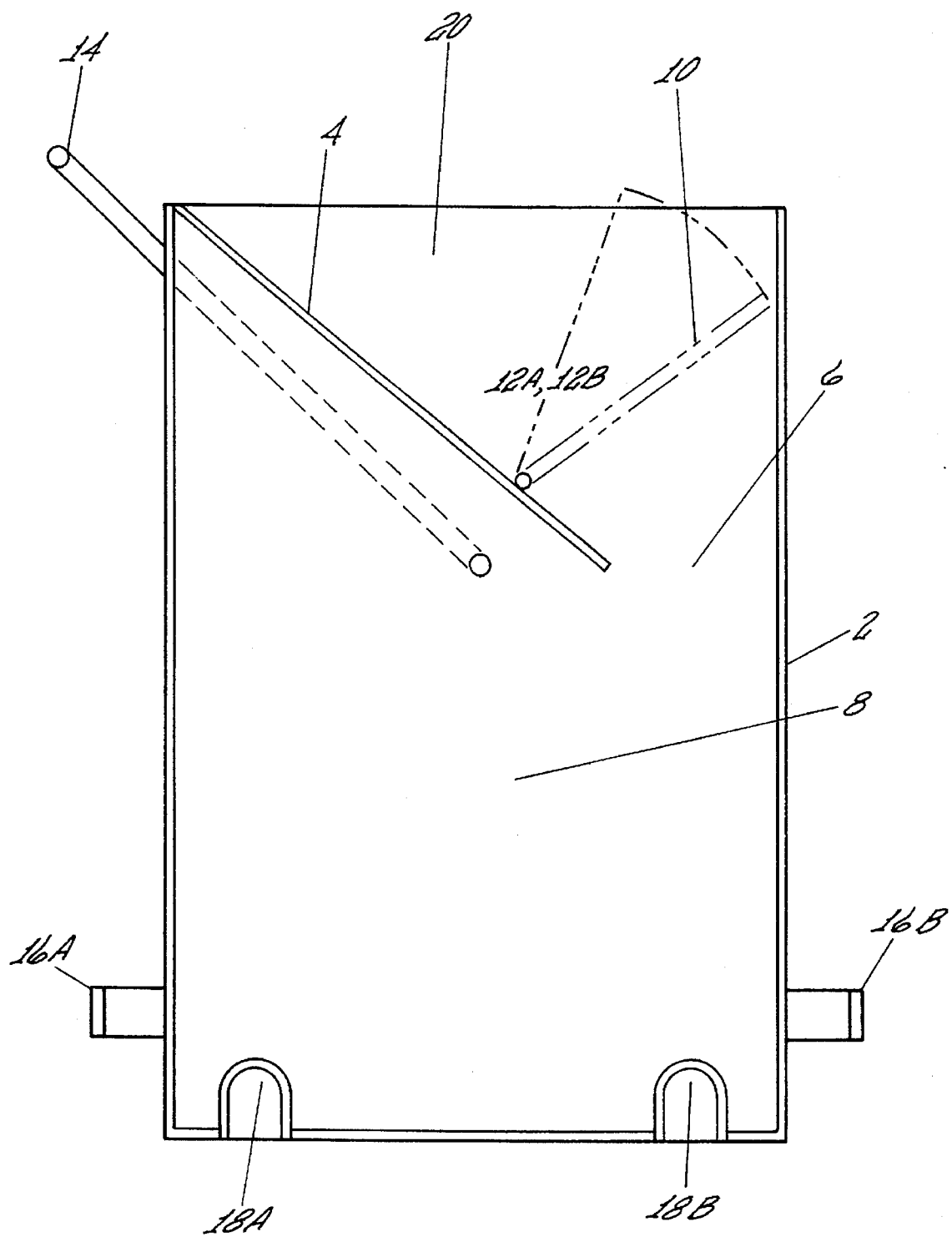
FIG. 3 is a side view
Figure 4:
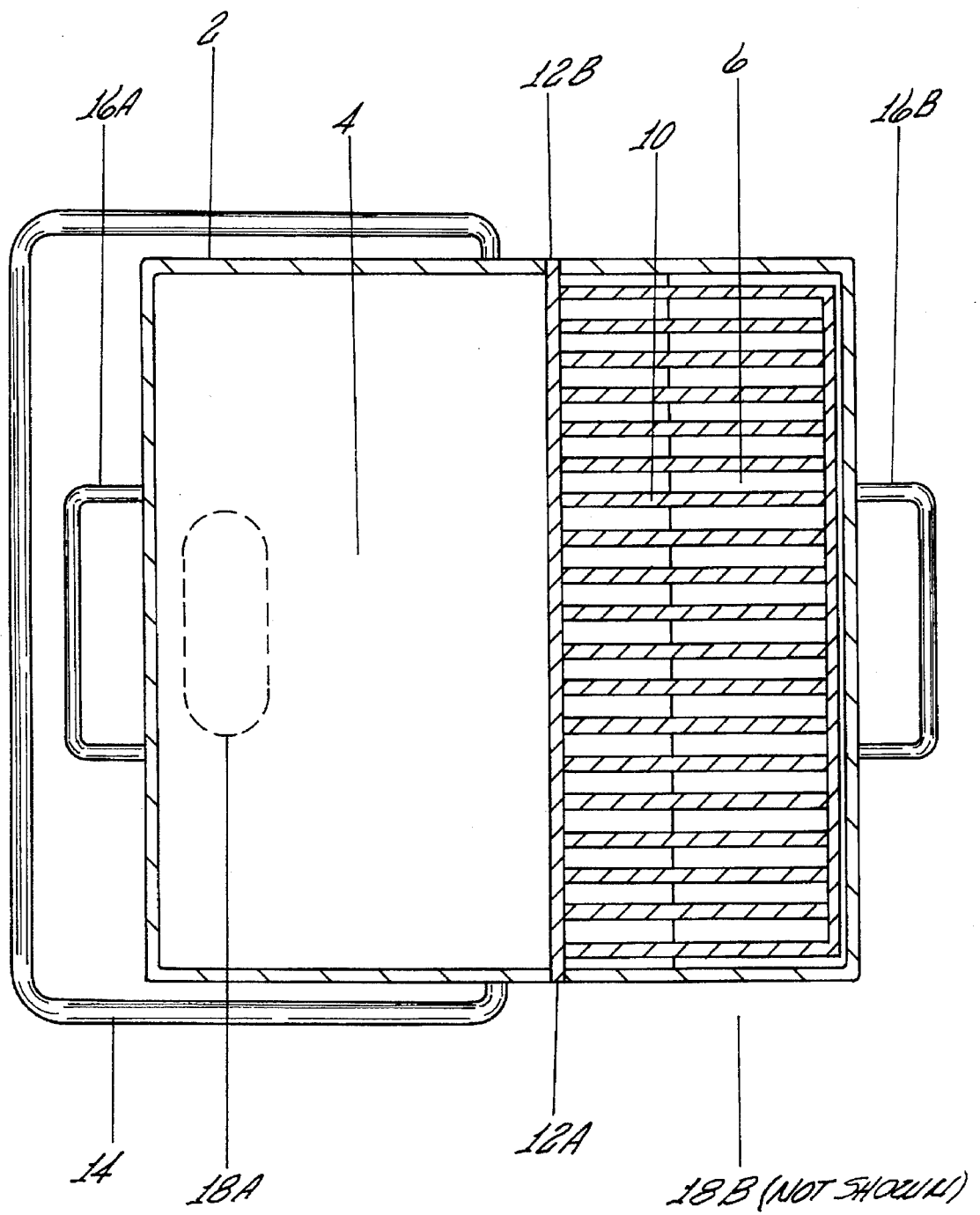
FIG. 4 is a top view

Operation of the device of the present invention will be described further with reference to FIG. 2. Steps A through D are a flow chart of sequential operations used to clean the litter. In step A the litter contaminated by clumped waste is poured into receptacle 20. The clumped waste and litter are directed by baffle 4 toward sieve 10 which is held in position by gravity and the pressure of the mass to be processed. The clumps of waste which are too large to pass through the sieve 10 remain in receptacle 20. The litter which passes through sieve 10 is now free of contaminated clumped waste and proceeds by means of gravity through opening 6 into collection chamber 8 as seen in B. In step C the separator is tilted by means of the bail 14 and or handle 16b or handhold 18 b in the direction of baffle 4 which serves to contain the litter in the collection chamber 8, while serving to convey the clumped waste into the trash or other suitable container for disposal. In step D the separator is tilted in the direction of sieve 10 by means of bail 14 and handle 16A or handhold 18A. The cleaned litter is thus propelled though opening 6 by gravity toward sieve 10, which due to the force of gravity and the pressure of the cleaned litter is opened by means of pivot 12a and 12b and flows via receptacle 20 into the litter box again.

CONCLUSIONS, RAMIFICATIONS AND SCOPE

Accordingly, it can be seen that the present invention provides an economical litter separator which operates simply, efficiently, and makes the task of litter cleaning neat and hygienic.

Although the description above contains many specificities, these should not be construed as limiting the scope of the invention but as merely providing illustrations of some of the presently preferred embodiments of this invention. Various other embodiments and ramifications are possible within its scope. For example, the device can be fabricated of wood, metal, injection molded plastic etc. The sieve can be fixed instead of pivoted. 16A and or 16B could be changed to 18A and or 18B. The upper section of the device comprised of parts 2,4,6,8,10,12,16A,16B,18A,18B, and 20 could be made detachable from 2 and 14 in order to facilitate cleaning. On a greater or lesser scale the principals of this device could find many other applications, for example, in the laboratory or industry.

Thus the scope of the invention should be determined by the appended claims and their legal equivalents, rather than by the examples given.

What is claimed is:

1. A device for separating a mixture comprising animal droppings and an absorbent litter wherein said animal droppings comprise a plurality of discrete members having a first size, and said litter comprises a plurality of discrete elements having a substantially uniform second size which second size is different from said first size, the device comprising:

(a) an open top container having a flat non-porous bottom portion disposed within a horizontal plane, and a side wall portion integral with said bottom portion and extending substantially vertically upward therefrom and terminating in a container rim, said bottom portion and said wall portion, in combination, forming a container having an open top portion bounded by said container rim;

(b) a fixed baffle portion comprising a flat sheet disposed within said open top container, at least a portion of said flat sheet disposed within said open top container, at least a portion of said flat sheet being rigidly affixed to the side wall portion thereof and wherein said flat sheet lies in a plane which is inclined with respect to said horizontal plane and wherein said flat sheet is dimensioned to provide an open space between said fixed baffle portion and said side wall; and (c) a sieve portion pivotally attached to said baffle and said side wall portion and disposed within said open top container to provide a porous barrier across said open space, said porous barrier having openings therein dimensioned to permit passage of said litter having said second size therethrough while preventing passage of the animal droppings therethrough.

* * * * *